US011091026B2

(12) United States Patent
Mussack et al.

(10) Patent No.: US 11,091,026 B2
(45) Date of Patent: Aug. 17, 2021

(54) COOLING SYSTEM AIR INTAKE WITH AN ADJUSTABLE LOUVER

(71) Applicant: DEERE & COMPANY, Moline, IL (US)

(72) Inventors: Jeffery C. Mussack, Eldridge, IA (US); Alan D. Sheidler, Moline, IL (US); Garrick W. Herbst, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/394,309

(22) Filed: Apr. 25, 2019

(65) Prior Publication Data
US 2020/0338979 A1 Oct. 29, 2020

(51) Int. Cl.
B60K 11/08 (2006.01)
B60K 13/02 (2006.01)
B60K 11/06 (2006.01)

(52) U.S. Cl.
CPC ........... B60K 11/085 (2013.01); B60K 11/06 (2013.01); B60K 13/02 (2013.01); B60Y 2200/222 (2013.01)

(58) Field of Classification Search
CPC ....... B60K 11/085; B60K 11/06; B60K 11/08; B60K 13/02; B60Y 2200/222
USPC ..................... 180/68.1, 68.2, 68.3
See application file for complete search history.

(56) References Cited

U.S. PATENT DOCUMENTS

| 3,384,232 | A | | 5/1968 | Turnbull et al. | |
|---|---|---|---|---|---|
| 3,388,694 | A | * | 6/1968 | Elmer | F01P 7/06 123/41.12 |
| 4,339,014 | A | * | 7/1982 | Berth | B60K 11/08 180/68.1 |
| 6,874,570 | B2 | * | 4/2005 | Horiuchi | F28D 1/0443 165/140 |

(Continued)

FOREIGN PATENT DOCUMENTS

EP 3114918 A1 1/2017

OTHER PUBLICATIONS

Vogele Mini Class Super 800-3i Tracked Paver Brochure, A Wirtgen Group Company, pp. 1-18, published Feb. 2018.
(Continued)

Primary Examiner — John D Walters
(74) Attorney, Agent, or Firm — Taft Stettinius & Hollister LLP; Stephen F. Rost

(57) ABSTRACT

A work vehicle including a body, a cooling system with one or more coolers, and a fan disposed adjacent to the coolers. A louver system is disposed adjacently to an inlet of the vehicle body. The louver system includes a first actuator operatively connected to a first plurality of slats and a second actuator operatively connected to a second plurality of slats. A first sensor operatively connected to a first cooler is configured to identify a first temperature of the first cooler and to generate a signal responsive to the identified first temperature. A second sensor operatively connected to a second cooler is configured to identify a second temperature of the second cooler and to generate a signal responsive to the identified second temperature. A position of the first plurality and second plurality of slats is determined respectively by the first and second temperatures.

19 Claims, 5 Drawing Sheets

(56) References Cited

U.S. PATENT DOCUMENTS

| | | | | |
|---|---|---|---|---|
| 7,310,961 | B2* | 12/2007 | Hoshi | B60H 1/004 |
| | | | | 165/42 |
| 8,230,959 | B2 | 7/2012 | Chaney et al. | |
| 8,316,974 | B2* | 11/2012 | Coel | B60K 11/085 |
| | | | | 165/44 |
| 9,827,846 | B2* | 11/2017 | Porras | B60L 58/26 |
| 2011/0308763 | A1* | 12/2011 | Charnesky | B60H 1/3229 |
| | | | | 165/41 |
| 2013/0092462 | A1 | 4/2013 | Chinta | |

OTHER PUBLICATIONS

Hamm Raco 350 Soil Stabilizer Used, https://www.ito-germany.com/hamm-raco-350-used, publicly available as early as Feb. 26, 2019.
Retrade Surplus Management, https://www.retrade.eu/en/aitem/409943/REMIXER_Soil_Stabilizer, Jan. 26, 2017.

* cited by examiner

1

COOLING SYSTEM AIR INTAKE WITH AN ADJUSTABLE LOUVER

FIELD OF THE DISCLOSURE

The present invention generally relates to a work vehicle, and more particularly to an air intake for a cooling system of a work vehicle.

BACKGROUND

Work vehicles including agricultural and construction vehicles are typically powered by internal combustion engines. Often, these vehicles are used in environments that are dirty, and the air contains dust and other particulate matter. Agricultural vehicles also work in environments where crop residue, as well as dirt and particulate matter are in the air. During operation, air is drawn into the frame of the vehicle and to the engine compartment for cooling the engine and to provide efficient combustion in the internal combustion engine. More particularly, the air supply should be free of particulate matter. In harvesting/construction environments, this generally requires an air filtration and/or cleaning system so that the air being pulled in can be cleaned sufficiently to be utilized for engine combustion or cooling. Even with such filtration/cleaning systems, particulate matter, dirt and/or crop residue can block, or partially block the air intake systems, resulting in the need for the system to be cleaned at frequent intervals.

In addition, to providing for efficient combustion in the engine, the air drawn from the exterior of the frame into the vehicle provides for cooling of a cooling system directed to one or more coolers that include coolers to: i) cool the engine; ii) cool a hydraulic system; and iii) cool air directed to a turbo charging system of an engine, if one is used. A flow of air drawn from the exterior of the frame is directed to the air filtration system and/or cleaning system before being directed to the coolers to insure that relatively clean air drawn through the coolers does not impede the flow of air through the coolers. Each of the coolers, however, can and does provide different amounts of cooling to the systems to which each of the coolers is connected. Consequently, the flow of air drawn from the outside and directed through the filtration system to the coolers, may not provide the required amount of cooling needed by one of the coolers. What is needed therefore is a system and process to vary the amount of air flow needed for each of the coolers of a cooling system.

SUMMARY

In one embodiment, there is provided a work vehicle including a vehicle body having a top and a side and an internal combustion engine located in an engine compartment of the vehicle body. A cooling system includes a fan configured to direct a flow of air. An inlet disposed near the top of the vehicle body and facing in an upward direction is configured to conduct ambient air from outside vehicle body to the cooling system. A louver system is disposed adjacently to the inlet and at the side of the vehicle body. The louver system includes a plurality of slats and one or more actuators, wherein the one or more actuators is operatively connected to the plurality of slats to adjust the angle of the slats with respect to the side of the vehicle and to provide a flow path for the flow of air directed by the fan.

In another embodiment, there is provided a work vehicle including a vehicle body having a top and a side and a cooling system having a plurality of stacked coolers and a fan disposed adjacent to the plurality of stacked coolers. The fan is configured to direct a flow of air through the stacked coolers. An inlet is disposed near the top of the vehicle body and faces in an upward direction to conduct ambient air from outside vehicle body to the cooling system. A louver system is disposed adjacently to the inlet and at the side of the vehicle body, wherein the louver system includes a first actuator operatively connected to a first plurality of slats and a second actuator operatively connect to a second plurality of slats. A first sensor is operatively connected to a first cooler of the plurality of stacked coolers, is configured to identify a first temperature of the first cooler, and to generate a signal responsive to the identified first temperature. A second sensor is operatively connected to a second cooler of the plurality of stacked coolers, is configured to identify a second temperature of the second cooler, and to generate a signal responsive to the identified second temperature.

In a further embodiment, there is provided a cooling system for a work vehicle including a first cooler and a second cooler disposed adjacently to the first cooler. A fan is disposed adjacently to the first cooler and the second cooler and is configured to direct a flow of air to the first cooler and the second cooler. A louver system includes a plurality of slats and one or more actuators, wherein the one or more actuators is operatively connected to the plurality of slats to adjust the angle of the slats to provide a flow path for the flow of air directed by the fan.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

Figure 1:
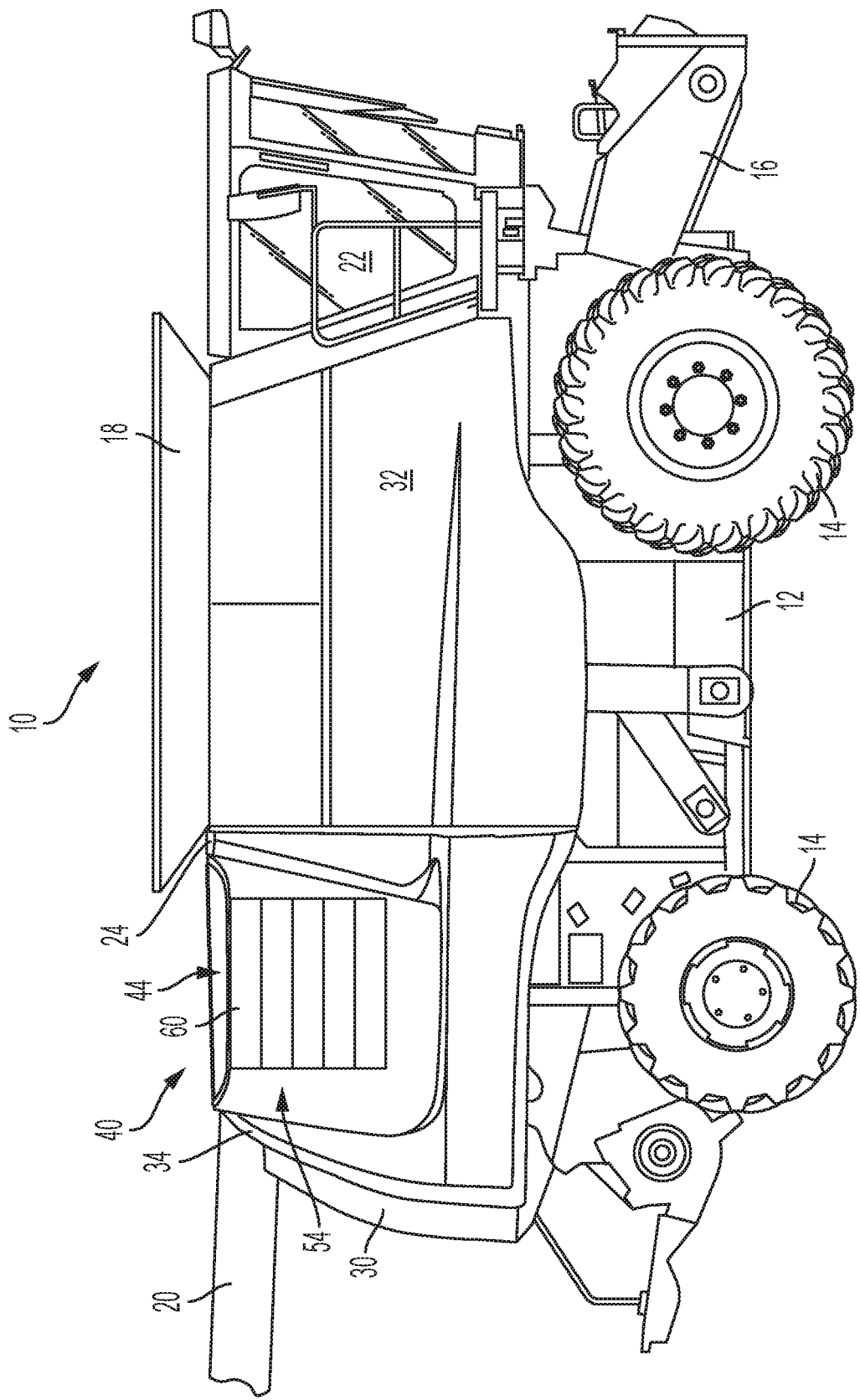
FIG. 1 is an elevational side view of a work vehicle.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Referring now to the drawings, and more particularly to FIG. 1, there is shown a work vehicle in the form of an agricultural harvesting machine, such as an agricultural combine 10. The work vehicle can also be in the form of a different type of vehicle used in a dirty or debris-laden operating environment. Such work vehicles include, but are not limited to, an agricultural tractor, construction vehicles, forestry vehicles, lawn maintenance vehicles, as well as on-road vehicles such as those used to plow snow, spread salt, or vehicles with towing capability. Additionally, work vehicles include other agricultural vehicles, such as a self-propelled combine-harvester, which includes a prime mover that generates power to perform work.

Combine 10 includes a supporting structure or body 12 having ground engaging wheels 14 extending from body 12. Although combine 10 is illustrated as having wheels 14, it could also have ground engaging tracks, either full tracks or half-tracks. The combine 12 also has a feeder house 16 through which harvested crop material is fed into the combine 10 for processing. Once processed, the harvested crop material is stored in a grain tank 18 in the combine 10 and unloaded from the combine 10 through an unloading auger 20. The operation of combine 10 is controlled from an operator's cab 22.

Mechanical power for combine 10 is provided by an internal combustion engine (not shown) contained in an engine compartment 24 in the rear portion of the combine 12. A cooler stack 26, includes a radiator 28 (see FIGS. 2 and 3) located in the engine compartment 24 that is used for circulating cooling fluid through the internal combustion engine and other systems. The combine 10 has a number of body panels surrounding the sides and rear of the combine, including, but not limited to: a rear panel 30, left side panels (not shown), right side panel 32, and radiator door panel 34, adjacent to the area of the engine compartment 24 where the radiator 28 is located, the radiator door panel 34 having an air scoop 40.

Figure 2:
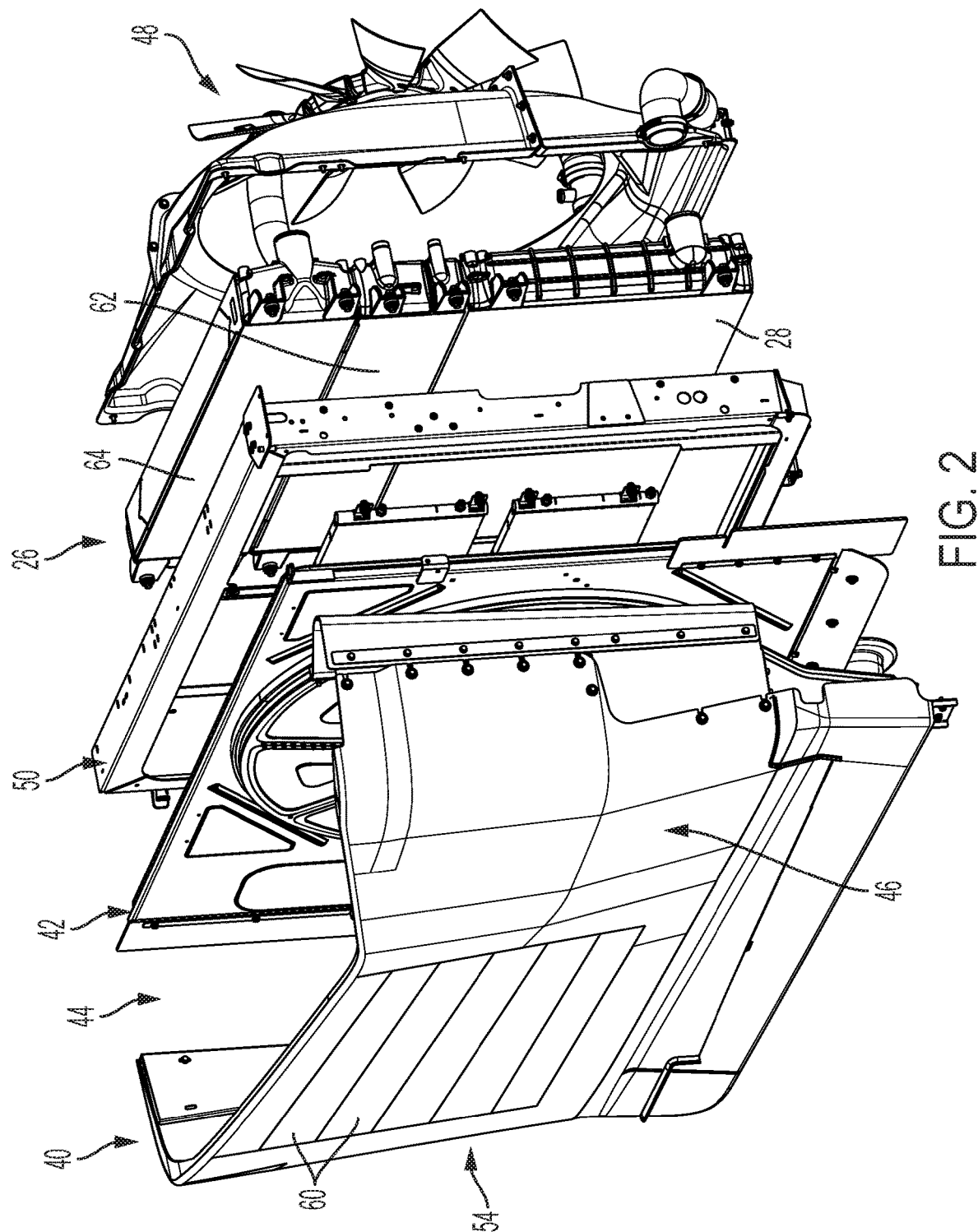
FIG. 2 is an exploded perspective view of a cooling system of the work vehicle.

As seen in FIG. 2, a cooling system includes the air scoop 40 being positioned adjacent to a screen 42, which is used to filter ambient air being drawn into the engine compartment 24. The screen 42 includes a panel with one or more screens. In other embodiments, the screen 42 is a rotary screen or a rectangular screen that is stationary. The screen as described herein is a rotary screen 42. Air scoop 40 has an inlet 44, which is positioned above the engine compartment 24. Typically, dirt and debris-laden air, which is stirred up by the equipment when in operation, rises to several feet above ground level. By positioning air scoop inlet 44 above the height of combine 10 and by facing air scoop inlet 44 in an upward direction, the air which is drawn into the engine is substantially cleaner. This in turn reduces the amount of foreign matter which must be screened and filtered from the incoming air through the rotary screen 42. In one or more embodiments, the rotary screen 42 is cleaned by a brush and/or a vacuum system located adjacently to the screen.

Air scoop 40 has a generally L-shaped flow path defined by an outer wall 46 extending from inlet 44 along the length of the outer wall 46 and into the front of the rotary screen 42. The L-shaped flow path directs the incoming air from a generally vertically downward direction to a generally horizontal direction entering rotary screen 42. Air scoop 40 is positioned in association with rotary screen 42 such that a sufficient flow of air flows through the rotary screen 44 and through the cooler stack 26. A fan 48 draws air through the air scoop 40, the rotary screen 42, and the cooler stack 26, into the engine compartment 24 where an engine 49 is located. In the embodiment shown, air scoop 40 has a generally U-shaped cross-section, approximating the width of rotary screen 42. The curved transition in outer wall 46 of air scoop 40 between inlet 44 and the area of the air scoop 40 adjacent to the rotary screen 42 redirects the air in the horizontal direction to rotary screen 42 without substantial restriction. A support frame 50 provides support for the rotary screen 42 and the cooler stack 26.

The air scoop 40 includes a louvered panel 54 supported by the outerwall 46 of the air scoop 40. The louvered panel 54 includes a plurality of slats 60 which are adjustable with respect to the outerwall 46. The slats are movable between a completely closed position, as illustrated in FIG. 2, to an open position, such that the amount of air drawn by fan 48 through the cooler stack 26 is varied. During operation, air is drawn through air scoop 40, including through the slats 60, depending on slat position, through the rotary screen 42 and through the cooler stack 26. The air is substantially cleaner since air scoop inlet 44 opens in an upward direction at or above combine 10. The location of the slats 60 are also located several feet above ground level which is generally higher than the dirt and debris-laden air which is stirred up by the equipment when in operation. Any dirt and debris laden air that does flow between the slats 60 is cleaned by the rotary screen 42.

Figure 3:
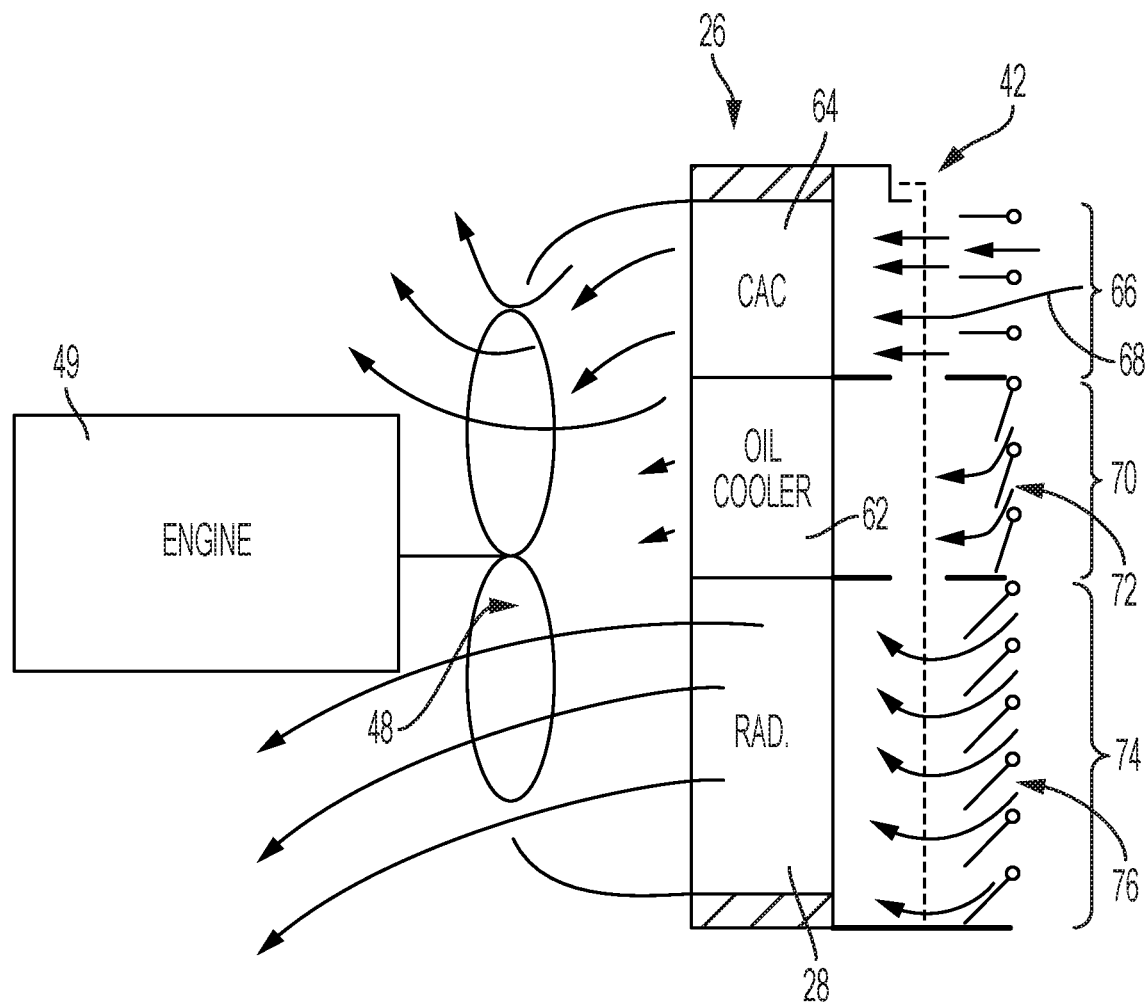
FIG. 3 is a schematic view of a cooling system of the work vehicle including a louver having slats.

FIG. 3 illustrates a schematic view of the slats 60 of FIG. 2 that are located at the air scoop 40. The location of the rotary screen 42 is indicated by the dotted line. The cooler stack 26 includes the radiator 28, an oil cooler 62 located above the radiator 28, and a charge air cooler (CAC) 64, located above the oil cooler 62. While each of the coolers of the cooler stack 28 is illustrated as being generally aligned along a vertical plane, other locations of the coolers of the cooler stack 28 are contemplated, either staggered or separate. Other embodiments are contemplated where the coolers are arranged in a different order from a bottom cooler to a top cooler. In other embodiments, additional or different coolers are included in the cooling system. For instance, in one embodiment, an electronic cooler is included to provide cooling for electric drives. Other configurations and locations of coolers are contemplated.

In one embodiment, the position of slats 60 is adjustable as groups or arrays of slats. In one embodiment, the slats are opened up to admit more air into the specific part of the cooler stack 26, such as the radiator, while closing off the air flow to the other coolers that have less heat rejection needs. In this way the cooling fan power demand could be reduced while focusing the air flow to the required cooling core. For example, if the vehicle's air conditioner switches on, the slats corresponding to the condenser are opened to provide more air flow without needing to speed up the fan or change blade pitch.

As seen in FIG. 3, the position of each of the slats 60 of a first group 66 of slats is adjusted as a group such that each of the slats 60 is positionable at the same orientation with respect to the outer wall 46. Each of the slats for the first group 66 are connected to a lever 67 to move each of the slats at the same time and to the same orientation as would be understood by a person having ordinary skill in the art. A flow of air 68 through the first group 66 is indicated. The flow of air 66 is directed by the slats of the first group 66 toward the CAC 64. A second group 70 of slats 60 is adjusted as a group, such that each of the slats 60 of the second group 70 is positioned at the same orientation with respect to the outer wall 46. A flow of air 72 is directed by the second group toward the oil cooler 62. A third group 74 of slats 60 is adjusted as a group, such that each of the slats 60 of the third group 74 is positioned at the same orientation with respect to the outer wall 46. A flow of air 76 is directed by the second group toward the oil cooler radiator 28. Each of the groups 70 and 74 are moved by a lever, such as lever 67, but are not illustrated.

Figure 4:
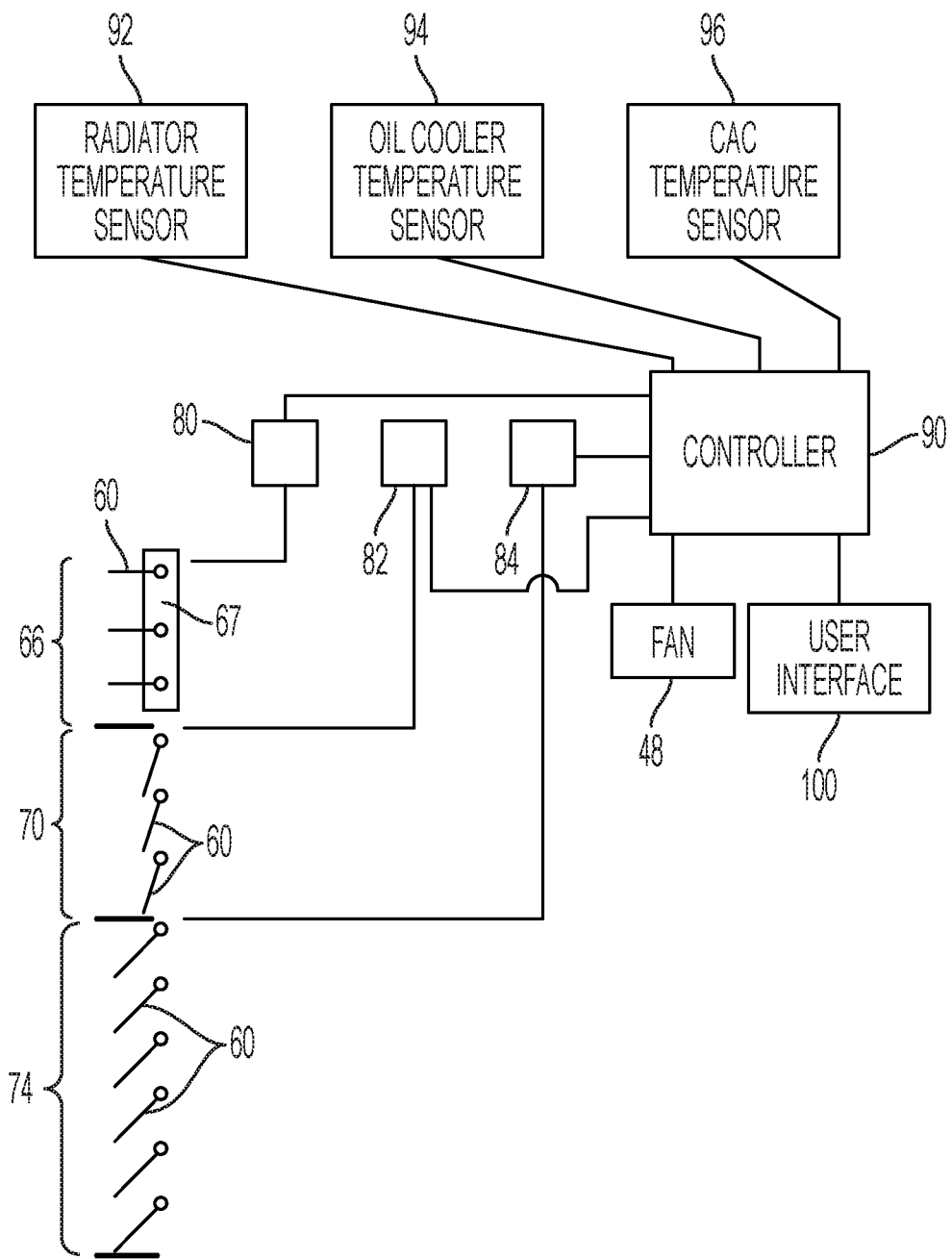
FIG. 4 is a schematic view of a controller and temperature sensors to determine the to adjust positions of slats based on the sensed temperature.

As illustrated in FIG. 4, each of the groups of slats 66, 70, and 74 is connected to an actuator, wherein the actuators include but are not limited to motors, hydraulic cylinders, and pneumatic devices. The group 66 is operatively connected to an actuator 80. The group 70 is operatively connected to an actuator 82. The group 74 is operatively connected to an actuator 84. Each of the actuators causes the slats of a respective group move from a closed position to an open position to modulate the amount of air flow into the cooling system. In one embodiment, the actuators are configured to move the slats of a group between two positions, the open position and the closed position. In another embodiment, the actuators are configured to move the slats to orientations between the open position and the closed position. As can be seen in FIG. 4, the group 66 is in the open position and the groups 70 and 74 are at positions between the closed position and the open position. Depending on the amount of airborne dust and the cooling air flow needed to dissipate heat loads experienced by the engine, the oil cooled systems, and the turbocharged system, the slats are closed down completely to prevent clogging by dust. The angle of the slats changes when moved from a closed position to an open position.

By adjusting the position of the slats or groups of slats, operation of the vehicle continues in severe debris clouds while avoiding screen clogging and radiator core plugging. Conversely, if the debris conditions are favorable, the slats are opened up to allow free flow of air into the cooling system, while the fan speed or pitch angle of the fan is decreased to save parasitic engine power. This setting is useful during road transport, for example, when there is insignificant airborne dust.

Multiple actuators enable individual slats to be opened or closed independently. In different embodiments, one or more slats are closed off at the bottom of the intake scoop to minimize dust down low. The remaining slats located a higher position are opened up to maintain air flow while at the same time reducing entry of dust into the cooling package.

For parallel cooler stacks, slats are opened to admit more air into the specific cooler, for instance the radiator, in the package while closing off others with less heat rejection needs. In this way the cooling fan power demand could be reduced while focusing the air flow to the required cooling core.

Each of the actuators 80, 82, and 84 are operatively connected to a controller 90 which in one embodiment includes a memory configured to store program instructions and a processor device configured to execute the stored program instructions to adjust the position of the actuators. In other embodiments, the controller 90 is a distributed controller having separate individual controllers distributed at different locations on the vehicle 10. In addition, while the controller is generally hardwired by electrical wiring or cabling to related components, in other embodiments the controller 90 includes a wireless transmitter and/or receiver to communicate with a controlled or sensing component or device which either provides information to the controller or transmits controller information to controlled devices.

The controller 90, in different embodiments, includes one or more microprocessors, and the associated memory, which can be internal to the processor or external to the processor. The memory can include random access memory (RAM) devices comprising the memory storage of the controller 90, as well as any other types of memory, e.g., cache memories, non-volatile or backup memories, programmable memories, or flash memories, and read-only memories.

The controller 90 executes or otherwise relies upon computer software applications, components, programs, objects, modules, or data structures. Software routines resident in the included memory of the controller 90 or other memory are executed in response to the signals received. The executed software includes one or more specific applications, components, programs, objects, modules or sequences of instructions typically referred to as "program code". The program code includes one or more instructions located in memory and other storage devices that execute the instructions resident in memory, which are responsive to other instructions generated by the system, or which are provided at a user interface operated by the user. The processor is configured to execute the stored program instructions as well as to access data stored in one or more data tables.

One or more temperature sensors are configured to determine the temperatures of fluid moving through the radiator 28 or of the temperature of the radiator itself, of fluid moving through the oil cooler 62 or the temperature of the oil cooler itself, and the temperature of the air moving through the charge air cooler 64 or the temperature of the charge air cooler itself. As the load on each of the coolers, the cooling cores, increases, slats in specific areas open only as far as necessary to meet the cooling requirements for any particular cooler. None, some, or all slats open as far as necessary to keep air flowing to coolers to meet cooling requirements, while trying to minimize the amount of debris laden air ingested by cooling cores.

A radiator temperature sensor 92 is operatively connected to the radiator and to the controller 90. Radiator temperature is identified by the radiator temperature sensor and transmitted to the controller 90. Upon receipt of the radiator temperature, the controller transmits a signal to the actuator 80 to adjust the orientation of the slats 60 of the group 74. In one embodiment, the controller 90 compares the radiator temperature to a predetermined value of radiator temperature to determine whether the slats 60 of the group 74 should be adjusted from the closed position to the open position and from the open position to the closed position. In another embodiment, the controller 90 compares the radiator temperature to a predetermined range of radiator temperature values to adjust the orientation of the slats along a range of orientations from the closed position, to positions between the closed position and the open position, and to the open position. The ranges of values are used to move from the open position to the closed position and to orientations therebetween.

An oil cooler temperature sensor 94 is operatively connected to the oil cooler 62 and to the controller 90. An oil cooler temperature is identified by the oil cooler temperature sensor 94 and transmitted to the controller 90. Upon receipt of the oil cooler temperature, the controller transmits a signal to the actuator 82 to adjust the orientation of the slats 60 of the group 70. In one embodiment, the controller 90 compares the oil cooler temperature to a predetermined value of oil cooler temperature to determine whether the slats 60 of the group 70 should be adjusted from the closed position to the open position and from the open position to the closed position. In another embodiment, the controller 90 compares the oil cooler temperature to a predetermined range of oil cooler temperature values to adjust the orientation of the slats along a range of orientations from the closed position, to positions between the closed position and the open position, and to the open position. The ranges of values are used to move from the open position to the closed position and to orientations therebetween.

A CAC temperature sensor 96 is operatively connected to the CAC 64 and to the controller 90. A CAC temperature is identified by the CAC temperature sensor 96 and transmitted to the controller 90. Upon receipt of the CAC temperature, the controller transmits a signal to the actuator 84 to adjust the orientation of the slats 60 of the group 66. In one embodiment, the controller 90 compares the CAC temperature to a predetermined value of CAC temperature to determine whether the slats 60 of the group 66 should be adjusted from the closed position to the open position and from the open position to the closed position. In another embodiment, the controller 90 compares the CAC temperature to a predetermined range of CAC temperature values to adjust the orientation of the slats along a range of orientations from the closed position, to positions between the closed position and the open position, and to the open position. The ranges of values are used to move from the open position to the closed position and to orientations therebetween.

Additional cooling features are provided by the fan 48 whose rotating speed or blade pitch is adjusted by controller 90 using the temperature values of the radiator 28, the oil cooler 62, and the CAC 64. The fan 48 is configured as a variable speed fan, a variable blade pitch fan, or both. Depending on the temperatures being sensed, the fan speed and/or the blade pitch is adjusted based on the individual orientation or group orientation of the slats 60. In those situations where the screen needs cleaning, the slats are moved to the completely open position and the fan is commanded to reverse pitch to aid in cleaning off the screen. In one embodiment, the slats are opened in response to an instruction transmitted by the controller when the variable blade pitch is commanded to be reversed.

A user interface 100 is operatively connected to the controller 90 and includes a user interface screen or display having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons. The user interface 100 is configured to receive inputs from a user, such as the operator of the vehicle 10. In one embodiment, the user interface 100 includes an input device to move the orientation of the slat or slats from and open position to a closed position and vice versa. For instance, when the vehicle is traveling on the road between harvesting locations, the slats are moved to a closed position by the operator using the close feature at the user interface. Since there is no harvesting being performed, the engine experiences a reduced load and therefore requires less cooling. By closing the slats, the noise of the vehicle is reduced to meet noise requirements. When the slats are moved to an open position by an operator, air flow is increased and fan power is reduced. In one or more embodiments, the user interface 100 includes a road transport button and the slats are adjusted based on predetermined software logic. For instance, in one embodiment, the position of the slats are adjusted based on engine speed or vehicle speed.

In another embodiment, the user interface includes a user interface selector to move between manual control and automatic control of the slats. For instance, as the machine begins to harvest, the user interface is set to the manual position and the slats are set to be closed thereby minimizing the amount of debris the machine ingests. As the machine moves from this starting condition, the user interface is set to the automatic position, and the slats are adjusted by the controller 90 receiving temperature signals from the temperature sensors.

Figure 5:
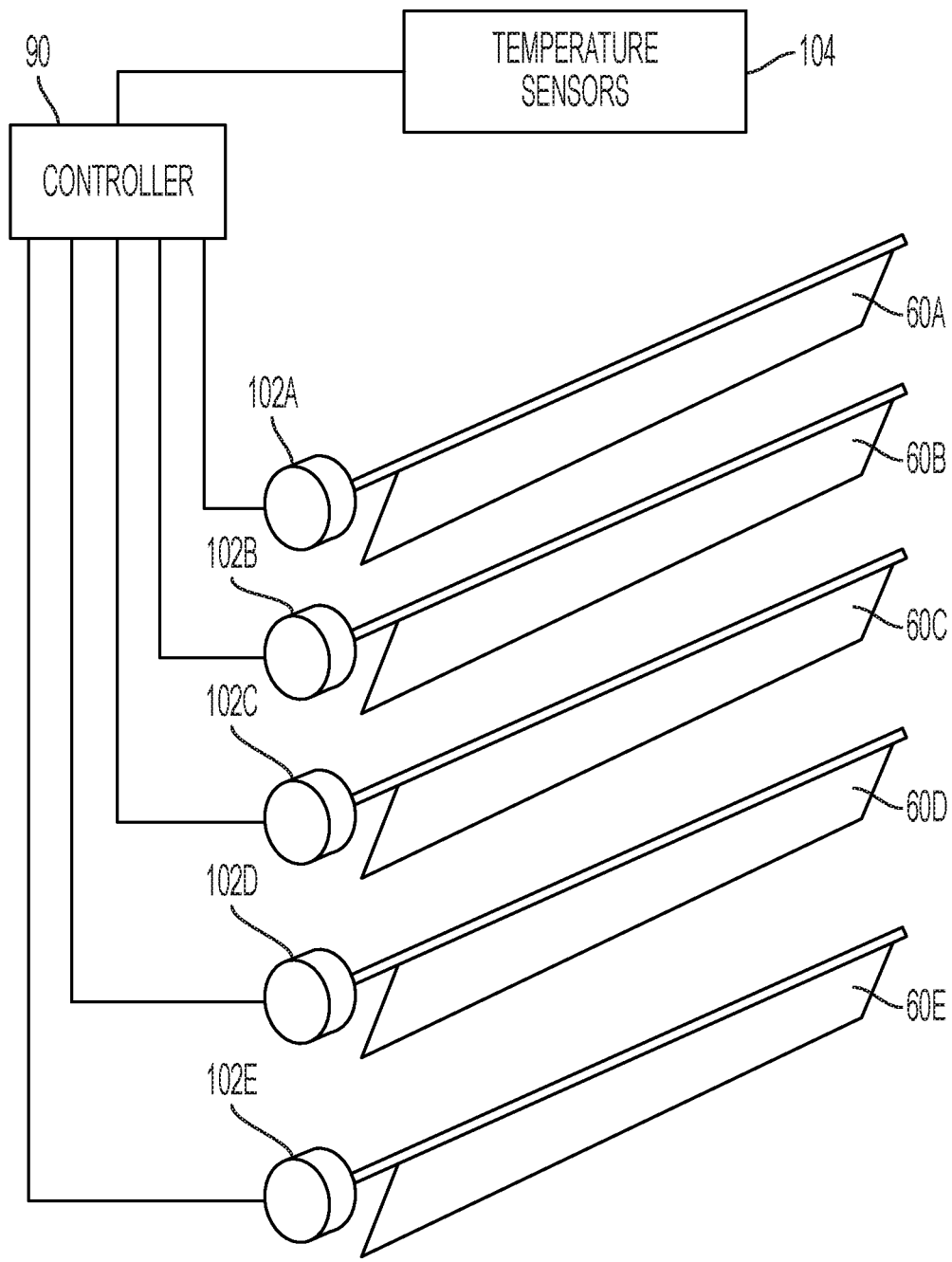
FIG. 5 is a schematic perspective view of a plurality of slats each being adjustable by one of a plurality of actuators.

FIG. 5. illustrates another embodiment of an arrangement of a control system of the orientation of slats 60A through 60E by the controller 90. In this embodiment, each of the slats 60 is operatively connected to and moved by a single actuator 102A through 102E. A plurality of temperature sensors 104 are operatively connected to the controller 90 and identify the temperatures of each of the coolers 28, 62, and 64. In this embodiment, the orientation of each of the slats 60 is individually controllable by one of the associated actuators 102. While the orientation of each slat 60 is individually controllable, the controller 90 is configured to set the orientation of each of the slats 60 based on the signal received from one of the temperature sensors. For instance, adjacent slats 60D and 60E are positionable at different orientations or at the same orientation. In this way, groups of slats are positionable at the same orientation or at different orientations. Since the slats are individually controllable, slats that direct air to a single cooler are positionable at the same orientation or at different orientations.

As described herein, the one or more embodiments enable modulating air flow to keep dust/debris out of the cooling system in dusty conditions. During times of specific needs, individual slats are opened to admit increased cooling air mass flow to the cooler(s) needing air without the need to increase fan speed or pitch angle. By providing adjustable slats, fan power is reduced, which reduces fuel consumption. Cooing capability is improved, and the amount of dust clogging the cooler is reduced.

While exemplary embodiments incorporating the principles of the present invention have been disclosed hereinabove, the present invention is not limited to the disclosed embodiments. Instead, this application is intended to cover any variations, uses, or adaptations of the invention using its general principles. For instance, while the targets are provided during the formation of an axle, the targets in other embodiments are components that are separately produced from the production of the axle, and are fixedly attached to the axle once formed. Consequently, this application is intended to cover such departures from the present disclosure as come within known or customary practice in the art to which this invention pertains.

The invention claimed is:

1. A work vehicle comprising:
a vehicle body including a top and a side;
an internal combustion engine located in an engine compartment of the vehicle body;
a cooling system including a fan configured to direct a flow of air;
an inlet disposed near the top of the vehicle body and facing in an upward direction to conduct ambient air from outside vehicle body to the cooling system; and
a louver system disposed adjacently to the inlet and at the side of the vehicle body, wherein the louver system includes a plurality of slats and one or more actuators, wherein the one or more actuators are operatively connected to the plurality of slats to adjust the angle of the slats with respect to the side of the vehicle and to provide a flow path for the flow of air directed by the fan.

2. The work vehicle of claim 1 wherein the plurality of slats includes a first plurality of slats operatively connected to a first actuator of the one or more actuators and a second plurality of slats operatively connected to a second actuator of the one or more actuators.

3. The work vehicle of claim 2 wherein the cooling system includes a first cooler and a second cooler disposed adjacently to the first cooler, wherein the first plurality of slats is located to direct the flow of air to the first cooler and the second plurality of slats is located to direct the flow of air to the second cooler.

4. The work vehicle of claim 3 wherein the first cooler is stacked with respect to the second cooler such that the first cooler is located closer to the top of the vehicle body than the second cooler, and the first plurality of slats is stacked with respect to the second plurality of slats such that the first plurality of slats is closer to the top of the vehicle body than the second plurality of slats.

5. The work vehicle of claim 4 wherein the cooling system includes a third cooler, wherein the second cooler is stacked with respect to the third cooler and is closer to the top of the vehicle than the third cooler.

6. The work vehicle of claim 5 wherein the first cooler comprises a charge air cooler, the second cooler comprises an oil cooler, and the third cooler comprises a radiator.

7. The work vehicle of claim 1 further comprising a first sensor operatively connected to the cooling system and to the one or more actuators of the louver system, wherein the sensor is configured to identify a temperature of the cooling system, to generate a signal responsive to the identified temperature, and to cause the one more actuators of the louver system to adjust the angle of the slats.

8. The work vehicle of claim 7 further comprising a second sensor operatively connected to the cooling system, wherein the first sensor is configured to identify a first temperature of the cooling system, to generate a first signal responsive to the identified first temperature, and to cause a first actuator of the one or more actuators to adjust a first plurality of slats of the plurality of slats, wherein the second sensor is configured to identify a second temperature of the cooling system, to generate a second signal responsive to the identified second temperature, and to cause a second actuator of the one or more actuators to adjust a second plurality of slats of the plurality of slats.

9. A work vehicle comprising:
 a vehicle body including a top and a side;
 a cooling system including a plurality of stacked coolers and a fan disposed adjacent to the plurality of stacked coolers configured to direct a flow of air through the stacked coolers;
 an inlet disposed near the top of the vehicle body and facing in an upward direction to conduct ambient air from outside vehicle body to the cooling system;
 a louver system disposed adjacently to the inlet and at the side of the vehicle body, wherein the louver system includes a first actuator operatively connected to a first plurality of slats and a second actuator operatively connect to a second plurality of slats; and
 a first sensor operatively connected to a first cooler of the plurality of stacked coolers configured to identify a first temperature of the first cooler and to generate a signal responsive to the identified first temperature, and a second sensor operatively connected to a second cooler of the plurality of stacked coolers configured to identify a second temperature of the second cooler and to generate a signal responsive to the identified second temperature.

10. The work vehicle of claim 9 further a third actuator operatively connected to a third plurality of slats, and a third sensor operatively connected to a third cooler of the plurality of stacked coolers configured to identify a third temperature of the third cooler and to generate a signal responsive to the identified third temperature.

11. The work vehicle of claim 10 further comprising a processor operatively connected to the first, second, and third sensors, and to the first, second, and third plurality of actuators, wherein the processor is configured to adjust one of the first, second, and third plurality of actuators in response to a corresponding one of the first, second, and third temperatures.

12. The work vehicle of claim 11 wherein the first cooler comprises a charge air cooler, the second cooler comprises an oil cooler, and the third cooler comprises a radiator.

13. A cooling system for a work vehicle, the cooling system comprising:
 a first cooler;
 a second cooler disposed adjacently to the first cooler;
 a fan disposed adjacently to the first cooler and the second cooler and configured to direct a flow of air to the first cooler and the second cooler; and
 a louver system including a plurality of slats and a plurality of actuators, wherein each one of the plurality of actuators is operatively connected to a corresponding one of the plurality of slats to adjust the angle of the slats individually to provide a flow path for the flow of air directed by the fan, wherein the plurality of slats includes a first plurality of slats operatively connected to a first plurality of actuators of the plurality of actuators, each of which is operatively connected to a corresponding one of the first plurality of slats, and a second plurality of slats operatively connected to a second plurality of actuators of the plurality of actuators, each of which is operatively connected to a corresponding one of the second plurality of slats.

14. The cooling system of claim 13 wherein the first plurality of slats is located to direct the flow of air to the first cooler and the second plurality of slats is located to direct the flow of air to the second cooler.

15. The cooling system of claim 14 wherein the first cooler is stacked with respect to the second cooler, and the first plurality of slats is stacked with respect to the second plurality of slats.

16. The cooling system of claim 15 wherein the cooling system includes a third cooler, wherein the second cooler is located above the third cooler, and the plurality of slats includes a third plurality of slats operatively connected to third plurality of actuators of the plurality of actuators, each of which is operatively connected to a corresponding one of the third plurality of slats, wherein the third plurality of slats is located to direct the flow of air to the third cooler.

17. The cooling system of claim 16 wherein the first cooler comprises a charge air cooler, the second cooler comprises an oil cooler, and the third cooler comprises a radiator.

18. The cooling system of claim 14 further comprising
 a first sensor configured to identify a first temperature of the first cooler, to generate a first signal responsive to the identified first temperature, and to cause the first plurality of actuators to adjust the first plurality of slats of the plurality of slats based on the first signal, wherein each of the first plurality of slats is individually controllable by one of the first plurality of actuators; and
 a second sensor is configured to identify a second temperature of the second cooler, to generate a second signal responsive to the identified second temperature, and to cause the second plurality of actuators to adjust the second plurality of slats of the plurality of slats based on the second signal, wherein each of the second plurality of slats is individually controllable by one of the second plurality of actuators.

19. The cooling system of claim 18 wherein the fan includes a plurality of blades having a controllable pitch and further comprising a processor operatively connected to the first and second sensors, and to the first and second plurality of actuators, wherein the processor is configured to adjust the pitch of the blades and to adjust the first plurality and second plurality of actuators in response to a corresponding one of the first and second temperatures.

\* \* \* \* \*